United States Patent
Frieden et al.

(12)

(10) Patent No.: US 6,480,100 B1
(45) Date of Patent: Nov. 12, 2002

(54) RADIO FREQUENCY IDENTIFICATION TAG FORMATTING METHOD

(75) Inventors: Donald J. Frieden, Friendswood, TX (US); John F. Meyo, Lancaster, NY (US); William Clay Weston, Kerrville, TX (US)

(73) Assignee: SAT Corporation, Houston, TX (US)

( * ) Notice: Subject to any disclaimer, the term of this patent is extended or adjusted under 35 U.S.C. 154(b) by 123 days.

(21) Appl. No.: 09/802,730

(22) Filed: Mar. 9, 2001

(51) Int. Cl.$^7$ .................................................. H04Q 5/22

(52) U.S. Cl. .................... 340/10.1; 340/10.51

(58) Field of Search .............................. 340/10.1, 10.5, 340/10.51, 505; 707/101

(56) References Cited

U.S. PATENT DOCUMENTS

| | | | |
|---|---|---|---|
| 5,600,683 A | * 2/1997 | Bierach et al. | 375/363 |
| 5,929,779 A | * 7/1999 | MacLellan et al. | 340/10.2 |
| 6,172,596 B1 | * 1/2001 | Cesar et al. | 340/10.41 |

OTHER PUBLICATIONS

Brochure: ISO 11784, International Standard, "Radio–Frequency Identification of Animals—Code Structure".
Brochure: ISO 11785, International Standard, "Radio–Frequency Indentification of Animals–Technical Concept".

* cited by examiner

*Primary Examiner*—Thomas Mullen
(74) *Attorney, Agent, or Firm*—Browning Bushman, P.C.

(57) ABSTRACT

Methods are disclosed for using an RFID tag associated with a component, and for organizing and storing data on the RFID tag in a user selected format. The selected data format may be recorded or stored remote to the tag, with a data format name. The data format name may be stored on the RFID tag, such that a tag interrogator retrieving the data format name from the tag may thereafter retrieve and/or load the corresponding data format to properly parse and interpret the data stored on the tag, in that format. Thereby, a customized data format may be used, while the data format need not be provided on the tag. The methods also include providing more than one data format on a particular tag, such as where each data format is defined by a corresponding user of a particular portion of the tag. Thereby, a tag may include multiple formats to meet the data storage needs of multiple users of a tag. Methods are also included to improve or maximize effective utilization of the available memory on an RFID tag.

20 Claims, No Drawings

RADIO FREQUENCY IDENTIFICATION TAG FORMATTING METHOD

BACKGROUND OF THE INVENTION

Radio frequency identification ("RFID") tags are electronic memory devices to which data representing information may be written to and/or read from by an RFID interrogator. The tag may be affixed to or otherwise associated with a particular tagged component, including an item, animal, assembly, device, or product, to store information on the tag relating to that tagged component.

The RFID tag may include a memory chip and a radio signal receiving and transmitting device, both encapsulated together, comprising a transponder. The transponder may be housed within a plastic or otherwise protective housing. The housing containing the transponder may be affixed to the tagged component.

The RFID tag may be communicated with by an RFID tag interrogator, comprising a radio signal sending and receiving device, and a recorder for storing transmitted data. The RFID tag may also include a processor for reformatting or otherwise processing the transmitted data. The interrogator may also comprise multiple components, such as a hand-held transceiver device, and a computer or other storage and/or processing component to handle data storage, processing, and transmission between the hand-held transceiver and the processor.

In prior art RFID tag uses, the format and content of data stored on an RFID tag is structured in a standardized data format. The standardized data format is typically common to a particular industry or group, and to be useable within that industry or group for the intended information storage purpose, the data stored on the tags must be formatted in the standardized format to be understandable to an RFID tag interrogator.

Such practices work well in certain industries, such as for the identification of animals in a feedlot, where a standardized data structure or formatting requirements for the data on the tags may be anticipated. Thereby, the standardized format may successfully accommodate the data formatting needs for that particular industry. Another example, is product bar codes, where a standardized bar formatting system may serve to assign essentially every commercially mass marketed product with a bar code. The data requirements are basically just a product number. Thereafter, the product number may be referenced to other databases containing additional information regarding that particular product. Similarly, an RFID tag such as used in the animal tracking industry may contain all needed information within a tag including a country or location code, and a unique animal identification number. Thereby, a common format for the data stored on the tag may be used throughout the cattle industry.

However, such tag systems may be inefficient or impose undesirable limitations in an industry where no particular standardized data format may serve all data storage and retrieval needs for a particular industry. For example, in an industry where it may be desirable to include on a tag, a substantial amount of component identification, composition and/or historical data related to that particular component, the probability that everyone concerned with reading and/or writing data to or from the tag may desire a particular common data format becomes increasingly unlikely. Such scheme may also create a highly inefficient use of the limited available memory capacity on the tag.

For example, in the petrochemical processing industry, each processing plant will include a vast variety of component variations and equipment types and uses, and will be obtained from a substantial variety of manufacturers, and will be serviced by a wide array of inspectors, services and repairs during the life of each component. One manufacturer may desire only to include their five letter name and a series of data fields describing the product design and specifications, while another manufacturer of a similar component may desire to provide their fifteen character name, a full product description, manufacturing dates and location codes, factory testing data unique to that component, and cost information. Providing an RFID tag data formatting scheme to accommodate the needs of the second manufacturer may be highly inefficient to the first manufacturer. Conversely, providing a scheme to accommodate only the needs of the first manufacturer may be of little value to the second manufacturer.

Prior art RFID tag uses have utilized a selected data storage formatting scheme to accommodate the needs of a particular group of users, such as the cattle industry. Tag users within the group are provided a standardized tag data format, common to all users within that group, including storage on the tag for only pre-determined data fields, each having a pre-set field size and location. For some users, such system may be adequate, while others may feel that the tag is under-utilized or inefficient to meet their desired tag objectives. Little to no flexibility may be available to the dissatisfied tag users to customize the data storage on the tag to meet their desired objectives. If a particular user in a group reformatted the data on his tags, the tags would likely not be decipherable to other users within that group.

Another limitation to prior art methods for formatting data storage on RFID tags is the inability to provide for multiple, user definable data formats on a single RFID tag. With prior art tags, all users who write or read data to a tag have to know the data format on the tag, and conform thereto. Each user follows the same formatting scheme, and may not deviate therefrom and still retain data readily available to all other users.

A method is desired for using an RFID tag which provides each user of the tag with the ability to customize the data stored thereon in a customized format, while still being readily understandable by substantially any other users of the tag. A method is also desired which may permit multiple users to use a single tag and for each user thereof to define a format and utilize a corresponding portion of the full memory/storage capacity available on the tag.

It is desired that tag formatting methods of this invention may facilitate the creation of or become an industry standard, through overcoming the limiting disadvantages of prior art. A method is desired in which the method of customizing the RFID tag data format and making that format readily determinable by other users of the particular tag, may become an industry standard for substantially any industry. The disadvantages of the prior art are overcome by the present invention and an improved method of using an RFID tag and customizing data stored thereon. is hereinafter disclosed.

SUMMARY OF THE INVENTION

The present invention provides methods for customized formatting, structuring, and/or organizing data stored on a radio-frequency (RF) identification tag, while simultaneously making the custom format understandable to substantially anyone desiring to read the data thereon. According to this invention, an RFID tag user may select and define a series of data elements/fields the user desires to store on the tag. The tag user may define the order and location in which the data fields are stored on the tag. Thereby, each tag user may permit the data storage space available on the tag to meet that user's objectives for using the tag.

The tag user may store the data format in a data format file and provide that data format with a data format name. The data format name may be the file name. The data format file may be recorded under the data format file name, remote to the tag, such as in a computer or on a web site. The data format name may be made available on the RFID tag, such that accessing the tag provides the name of the data format file containing the solution or key to the customized data format file. Thereby, when another tag user later interrogates the tag, the user may be provided the name of the file containing the solution for the data format. The file may be located and loaded into the interrogator, such that the understandable information may be provided to another tag user. Thereby, the another tag user may periodically read or write data to the tag, according to the custom-selected tag format. Access to the data format definition may be made freely available, such as on a web site, or provided under restricted access to only select other users.

It is an objective of this invention to provide a method for using an RFID tag in which a tag user may create a customized format for storing data on the tag, without the user being constrained to a particular standardized format.

It is also an objective of the present invention to provide a method for allowing multiple users of a tag to each independently format and use a selected portion of the tag in a format desired or selected by that respective tag user and/or formatter.

It is a further object of this invention to allow a tag user to relatively easily exchange data between an RFID tag and an application program, such as a spreadsheet, word processor table, rich text delimited data tables, or database programs. A software tool set may be used to reformat data between the storage format used on the RFID tag, and any of a number of data formats useable by a selected application program.

As additional object of this invention is that the methods disclosed herein may become a standardized method of creating customized RFID tag data formats. Such standardization may permit industries such as the petrochemical industry to utilize RFID tags for component identification and information storage, which might not otherwise be practical for industry-wide data format standardization. Thereby, the method for creating customized RFID tag data formats may become standardized, as opposed to standardizing data formats.

It is a feature of the methods of this invention that a tag user may readily identify the name of the data format used on the tag, by reading the data format name directly from the tag, and thereafter locate, retrieve, load and use the corresponding data format in association with the tag interrogator.

It is a feature of this invention that the corresponding data format may be a data format selected by the tag user from a plurality of previously and subsequently created tag formats.

It is further a feature of this invention that multiple tag users may utilize a common RFID tag for data storage, each user using an assigned portion and location of the available tag memory, and formatting the data contained within their respective portion in a data format different from the other tag users.

It is a feature of this invention to provide methods to allow a tag formatter to allocate available tag memory among one or more tag users. The format of the allocated memory portions and locations also may be stored remote to the tag.

It is an advantage of the methods of this invention to provide the definition of a customized data format remote to the RFID tag and thereby conserve tag memory to be available for storage of data.

It is also an advantage of the methods of this invention that a particular tag format may be made available to a wide variety of potential tag users by making available the data format file and/or the header format file on a web site or in a networked location.

A further advantage of this invention is that data may be manipulated or reformatted by a software tool set to a format compatible with any of a plurality of data formats.

Another advantage of this invention is that a data format may be designed on an internet web site, then stored and/or made available to tag users on that or another internet web site.

It is also an advantage that a tag user may provide as much or as little component data on a particular RFID tag as the tag user desires. In addition, each data field or element may be customized and included in the selected data format.

A further advantage of this invention is that a set of data formats templates are provided in this disclosure, any or all of which and may be utilized as generic data formats. Such formats may be useful to at least a portion of the petrochemical industry.

Another advantage of this invention is that a portion of the data stored on each RFID tag may be protected by a data integrity check system or method, such as a cyclic redundancy check.

BRIEF DESCRIPTION OF THE TABLES

The Tables illustrate examples of formatting RFID tags according to methods of the present invention:

Table 1 illustrates the location of data bits that indicate the format code.

Table 2 illustrates definitions of each data bit when the format code value equals zero or one.

Table 3 illustrates definitions of each data bit when the format code value equals two or three.

Table 4 illustrates a layout of the format definition file

Table 5 illustrates supported data types for format code values of zero or one.

Table 6 illustrates supported data types for format code values of two or three.

DETAILED DESCRIPTION OF THE INVENTION

The data storage member may be encased within a protective housing, and may collectively be referred to as the RFID tag, which may be affixed to a particular component for storing information related to the component on the tag. Any component or piece of equipment, as for example a valve or a motor affixed with an RFID tag may be identified by data stored within the tag. Further, the tag may include manufacturing information, inspection, service, and repair information. Such information may be appended and modified during the life of the component, facilitating tracking the life history of the component. Further, the collection and storage of the information may be conveniently located within the tag affixed to the component. A tagged component may include a piece of equipment, a component part or a collection of components in an apparatus.

Data representing selected information may be written to and read from the RFID tag using any assigned radio frequency(ies), which may be generated by a transceiver/RFID tag interrogator or other device capable of communicating with the RFID tag. In addition to a transceiver and data storage memory device, an RFID tag may include a computing or processing device to enhance data storage, retrieval and/or processing. Data may be written, stored, retrieved and processed as a digital bit stream of data bits and may be of any defined format or structure. The characteristics of the transmission protocols between transponder and transceiver may be of any selected type but preferably may be defined by an industry standard, as for example ISO 11785.

The following definitions may be useful in understanding the nature of this invention:

Definitions (a) Header Block: May include all or a sub-divided portion of the memory/storage capacity of the RFID tag. Each header block may be formatted according to a separate, corresponding header format.

(b) Header Format: The layout or arrangement of the header blocks, and may include the size and location of each header block.

(c) Header Page: A page, line, or portion of code that may contain a data format name or code, and/or a header format name/code that defines the layout and meaning of the data on some related portion of the tag. A header page may include at least one data field for storing a fixed number of characters therein, such as ASCII characters. The characters may comprise a data format name/code or a header format name/code. A character may be defined broadly, and may be comprised of a bit or a collection of bits.

(d) Data Format: A layout or arrangement of the data fields to contain the data elements therein, and may include the data parsing arrangement, data field sizes and types, and locations of the data fields/elements. A data format name may be stored on the tag within a header page. For example, a data format name may comprise an alpha-numeric format code positioned in the 5 least significant bits of a header page. The data format code thereby may be used to retrieve the file that defines the layout and meaning of the remainder of the bits on the header page and/or the header block.

(e) Data Type: A field that may contain a code denoting the type of data which may be contained in a related record or field. See table 5 and 6 for specifics.

(f) CRC: Cyclic redundancy check; may include a 16-bit number used to verify data integrity.

(g) Format Definition Number: A globally unique 32-bit number used to relate a tag's data format to a stream of bits held external to the tag that may define the data format and meaning of the data on the tag.

(h) Format Definition File: A stream of bits that may be held in a binary file or may be held in some other persistent storage media remote to the tag that may define the layout and/or meaning of the data on a tag.

The methods of this invention may facilitate tracking and maintaining a unique identification reference for a component and may also include the ability to maintain other information pertaining to that component as may be of interest during the life of the component. The invention includes methods that may be used to define data formats, code structures, file structures, information content and a means for making this system universally available and flexible such that it may be applied to virtually any desired industry which may be interested in using such system. Included in this system is a unique method of representing data on the RFID tag so as to increase the useable space on any given tag.

Included are methods to create and maintain a relationship between the information stored on a tag and its data format definition which may be stored in a remote location. The methods may eliminate writing and storing the data format/data code structure definition on the tag, so as to save memory space on the chip. In one embodiment, a web-based system is included whereby users or interested parties may download from a web site any available data format which may define the data structure on the tag, in order to effectively communicate with a given RFID tag. In like manner, header formats also may be stored remote, accessed and downloaded.

The term "tag user" may include one who formats or defines a tag format, and may also include one who reads and/or writes data to or from at least a portion of the tag. Not all tag Lisers may format a tag. For example, a large company may have a designated person or group to format a particular set of tags, and then any other selected persons within the company may periodically read or write data to or from the tag. Tag users formatting a tag may format the tag in a customized data format which both stores a desirable array of information on the tag, and does so in an efficient manner to maximize use of the available memory space. As an alternative to building a tag format from scratch, or a customized tag format, a tag user may select one of a plurality of previously defined and available tag formats.

The tag formatter may select/define what data is to be stored on a tag, the order the data elements are positioned relative to one another, and where the elements are to be positioned within the tag. The tag formatter may further define the amount of data storage space dedicated to each particular data element/field, and the data type of each respective field, such as ASCII, date, or fixed digit. Thereby, the tag formatter or tag user may make efficient use of the limited data storage space available on the tag.

After selecting and defining the data format, the formatting tag user may select a data format name by which to identify the data format. In order for the methods of this invention to be usable as a global standard, the format name/file name should be globally unique. The name may be a text and/or numerical identification. For example, the data format may be saved with a file name. The file name may be stored on the tag, such that a tag interrogator may later determine the name of the data format file that contains the data format, to retrieve the format for use by the interrogator.

The selected data format may be stored or recorded remote to the tag in a location accessible to future tag users. By storing the data format file remote to the tag, additional memory capacity of the data storage member may be preserved for use in storing data rather than in storing a data structure or format file therein. In one embodiment, the data format may be remotely stored in an electronic file accessible to a tag interrogator through a computer network, such as on a web site, or loaded into the processor of a particular tag interrogator. The data format name thereby provides the link between the data stored on the tag and the solution or definition of how to interpret the data thereon.

Thereafter, a tag interrogator may prompt a particular RFID tag with a radio signal. The RFID tag may respond, providing at least the name of the data format for the data stored the data storage member. The tag interrogator may search internally for that particular format, and if not present, may access or prompt to access another location to retrieve and load the selected data format. The other location may be on a web site, or provided on a storage member, such as a floppy disk or computer hard drive. If desired, a code indicating the location of the file may be provided within the data format name, such that when the interrogator is provided the data format name, the interrogator may also thereby determine the probable location of the data format file.

A previously defined or a widely accessible generic data format may be used. Data formats defined by a particular tag user may also be made available to other users through downloading from the Internet. By making the previously defined data formats available for use by other formatters, the versatility and usefulness of RFID tags may be substantially improved. Tag data storage efficiency may also thereby be improved.

The methods of this invention also may permit an RFID tag to include more than one data format, and consequently, be definable by and useable by more than one particular group of tag users. The data storage space or capacity on a particular data storage member may be partitioned or sub-divided into header blocks, such that multiple header blocks may be provided on a tag. Thereby, each of multiple tag users may format, read and/or write data to a particular header block designated to or reserved for that respective tag user. For example, in one embodiment, a tag for use in the petrochemical industry may include two header blocks. A first header block may be assigned to a component manufacturer, wherein component specification, identification and manufacturing data may be written. The component manufacturer may be allocated the first one-half of the memory on the tag. A second header block may be allocated to a component user/purchaser, wherein component installation, use, inspection, repair and maintenance information may be recorded. The location and partitioning of the first and second header blocks may be defined in a header format file. Within a header block, a header page may be provided to contain the data format file and/or the header format file.

A tag user may define or select a data format for storing data on a tag that most efficiently meets the data storage needs/desires of that particular tag user. After selecting the data format, the formatting tag user may select a data format name identifying the data format. The name may be an alphanumeric name and may be stored as a file having the file name of the data format name. The file name may be stored on the tag, such that a tag interrogator may later determine the name of the data format file that contains the data format, to retrieve the format for use by the interrogator.

By recording/storing the data format file remote to the tag, additional memory capacity of the data storage member may be preserved for use in storing data rather than in storing a data structure or format file therein. Thereafter, a tag interrogator may prompt a particular RFID tag with a radio signal, and the tag may respond by providing at least the name of the data format selected for the data stored the data storage member. The tag interrogator may search internally for that particular format, and if not present, may access another location to retrieve and load the selected data format.

When the interrogator is provided/loaded with the data format necessary to correctly interpret data on a corresponding portion of the tag, the interrogator may retrieve the data and present the retrieved data to a tag user in an understandable or meaningful format. Thereby, data may be periodically read from or written to the tag by substantially any tag user who has been provided the data format, and/or a header format if more than one data format exists on a particular tag. The interrogator thereby may be defined as substantially any RFID tag data conveying and translating medium. The interrogator may be more than one component, such as the combination of a hand held transceiver and interconnected data processor and storage member, such as a computer.

In some embodiments, the data format may be stored directly on the tag, such as in a header page/row. For example, a company or industry may adopt a standardized format for at least a portion of the data stored on the tag, and may also leave a remainder portion for customized formatting by a tag user. In such embodiments, the format definition file may only be required to write the tag format to the tag. A user can read the data from the tag without possessing the format definition file.

In many commercially practical installations or uses, a substantial volume of data may be conveyed between an interrogator and a large number of tags, such as may be utilized in a petrochemical plant. It may also be desirable to manipulate or further process the data in one or more application programs, such as spreadsheets, word processor tables, rich text delimited data tables, or database programs. A software tool set may be included to make exchanging such large volumes of data commercially practical. The software tool set may comprise one or more instruction sets or programs to further reformat/translate data between the storage format used on the RFID tag and any of a number of data formats that may be useable by an application program. Such tool set may facilitate importing or exporting large blocks of tag data to and from a tag interrogator, and provides a user-friendly interface for manipulating the data. Such tool set may be constructed from available software programs and customized by a tag user to meet the interface needs or objectives of the particular user. Without such tool set, use of significant numbers of data formats among large numbers of RFID tags may restrict the practical or commercial usefulness of customized RFID tags. For example, a company may wish to compile a quarterly report of inspections performed on all of the valves in one of the company's plants, and populate a master spreadsheet with that data. In addition, the master spreadsheet may also be populated by data from other tags having different data formats thereon. The tool set may be useful to re-format the RFID tag data coming in from each of the different tag formats, into a common format presented in the master spreadsheet. Otherwise, significant manual, time-consuming manipulation or re-formatting of the data may be required.

As discussed briefly previously, to make a tag useful to more than one tag user, the storage space on a tag may be partitioned or sub-divided into one or more regions, which may be referred to as header blocks. Multiple header blocks may be provided on a tag. Thereby, each of the multiple tag users may read and/or write data to a particular header block of memory assigned to that respective tag user, in a format defined by that particular user. Consequently, a tag may become more useful to a larger group of potential tag users.

For example, in one embodiment, a tag for use in the petrochemical industry may include two header blocks. A first header block may be assigned to a component manufacturer, wherein component specification, identification and manufacturing data may be written. The component manufacturer may be allocated the first one-half of the memory on the tag. A second header block may be allocated to a component user/purchaser, wherein component installation, use, inspection, repair and maintenance information may be recorded. The location and partitioning of the first and second header blocks may be defined in a header format file. Within a header block, a header page may be provided to contain the data format file and/or the header format file.

An RFID tag may include only one header block, such that one data format may control or define all data stored on the tag. The one header block may include one header page or header row, wherein the data format name and the header format name may be stored. A tag interrogator may interrogate the tag and locate the header page(s). The interrogator may thereby receive the name of the data format file containing the data format the data on the tag is in, and/or the name of the header format file containing the header format the header block(s) is in. The interrogator may search internally for each of the data format file and the header format file, or the data contained within each of those files. If one of the files or the data contained within one of those files is not available within the interrogator, the interrogator may search outside of the interrogator for the formatting information.

For example, the header page may return a header format code/name of 0001. The interrogator may search internally and find that header format code/name 0001 means there is only one header block on the tag. If that information is not available within the interrogator, a header format file named 0001 may be downloaded from the internet into the interrogator, wherein the interrogator may be instructed that only one header block is on the tag. Additional detained information about the header block also may be included. If there had been two header blocks on the tag, the header format file may provide information defining the locations, size and/or line assignments for each header. The locations of the header page within each header block may be provided, including where in the header page the data format name may be located.

Continuing the example, a data format for data stored within the header block may be selected or defined by a tag user. The data format may be assigned a name, and the data format name may be stored in the header block, preferably within a header page in the header block. The data format may be defined or recorded in a data format file, which may be stored/recorded remote to the tag, under the data format name to identify the data format.

One embodiment may include a tag header format including two header blocks, a first header block and a second header block. Providing two header blocks may be determined by a tag formatter, such as an equipment manufacturer, or another tag user, such as the purchaser of the tagged component. The first header block may be reserved for use by the component/equipment manufacturer, and may provide for storing the manufacturer's name, assembly date. specification and trim information, size and rating information, and related information. The equipment manufacturer may select or define the data format for the first header block, and may customize their own format, or utilize a previously defined format, such as may be downloaded from the internet.

The second header block may be reserved for use by the component user/purchaser, and may provide for storing the components installation date, type of service, and utilization information, such as pressure and temperature information. Information pertaining to subsequent inspections and repairs may also be stored within the tag, as such information becomes available. Alternatively, a third header block for use by inspectors or repairers may be provided.

Additional header blocks may be provided on a tag for use by subsequent users, such as if the component is moved to a new installation. Thereby, the history of a component may be ordered into separate header blocks for each subsequent user or installation of that component. Additionally, each header block may be formatted with a different data format.

In tags formatted with multiple header blocks, the first header block may be a primary header block and may include separate header pages therein for each of the other header blocks. For example, in a tag formatted with two header blocks, each of the first two pages/rows of memory may contain a header page for a respective header block, e.g., the first page may include the header block for the first header block, and the second row may contain the header page for the second header block. Each of the first two pages also may be contained within the first header block.

Methods and embodiments of this system may be adapted as the basis for future industry standards, as for example a modification of "ISO 11784" for use relating to process industries. An industry standard according to this invention may facilitate the use of substantially any transceiver to read data from the transponder tag of any tag manufacturer. An industry standard for the technical concept of how the data communication is effected, may be compiled similar to or as described in "ISO 11785."

A method of this invention provides for arranging or parsing the data bits into a defined code structure/data format, which may be recognized by a program. The code in an RFID tag may be split into a number of code fields with each field having a defined meaning. Each field may be coded in natural binary with the high-order bit being leftmost. The structure of the code may be as defined in the attached Tables. Bit number one (1) may be the least significant bit (LSB) and bit number 64 may be the most significant bit (MSB). The definition of any given code structure may be written directly to a tag or may be placed on a web site by any interested party or a combination of both. That code structure then defines how the data on that particular tag is arranged. If made available, any other interested party may then access the web site and download the code structure in order that the code on the tag may be read by that party. Security measures may be included, which may prevent erasure or unauthorized tampering with data or impermissibly writing to the tag. Security may also be enforced at the application level.

In this system, the data bits on the RFID chip in the tag may be arranged into rows wherein each row may be considered a page and each page may contain 64 bits of usable data. In one embodiment, an RFID chip may contain approximately 17 data pages or lines for storing data, for a total of 1360 total bits of data storage capacity. Certain data bits on each row may be predefined leaving a lower number of usable data bits on that row, thereby also reducing the total usable bits on the chip. Headers may also define how many pages or rows of storage space are reserved for use by that header section. Header rows may be placed on the tag, either fully or partially with the remainder of the header file being located remote to the tag. Detail of the format of the header data may be either in the header on the tag or remote to the tag. In one embodiment of the header, the details of the fields on the tag are encoded on the header. In another embodiment, there is only a reference number on the header. This reference number is used to identify a file which includes the details of the fields on the tag.

A header format may include one, two or additional header rows/pages and may include a web based system for defining all or a portion of each header. An embodiment providing two header rows may be proposed as an industry standard for the petrochemical process industry. A header row/page may be utilized by the computer program which communicates with the transponder to interpret data on the tag or write data to the tag. In alternative embodiments in which the header data that provides the code structure is located on the tag, the header may be located on the first row for single header tags, or for multiple header tags, the headers may be written on the first, second or any other combination of rows of the RFID tag. However, embodiments writing all of the header data on the tag are generally not preferred embodiments as the header or headers may then become complicated and result in using a significant portion of the storage space on the tag to define the header.

Whether written fully on the tag or partially remote to the tag, a first header row may be defined by an initiating party, such as an original equipment manufacturer (OEM). If present, a second or additional header page/row may be defined by any other party, such as the end user of the component, a service or repair company, a purchaser of the component or any other interested party.

In a preferred embodiment, once the code structure is defined in each header, any interested party who may desire to read from or write to the RFID tag must know how each header defines the code structure and have that definition in the computer which communicates with the tag. The web based component of this system may be such that the party which defines the code structure in the header may place all or a portion of that information on a web site such that it may be accessed and downloaded by the interested party who desires to communicate with the tag. Code structures may include custom structures or the code structures may be defined by one or more generic code structures which may be available on the web. The code structure may also be designed on the Internet or may be designed separately and then uploaded onto a web site.

For example, an OEM that is a valve manufacturer may desire to store data on a tag where the data has the following attributes:

Manufacturer name having up to 20 characters

Model number having up to 10 characters

Serial number having up to 10 characters

Size being a floating-point number

Pressure rating being a floating-point number

Material specifications being an enumeration of a standard code set

Connection type being an enumeration of a custom code set

In one method of representation, the important details of this data format such as how to parse, read and interpret the current values stored on a particular tag may be completely stored in the header row. Another method of representation may place a globally unique number in a field of the header row of the tag. This number may then be used to relate a set of tags having this data format with the details of how the data is stored on the tag and optional comments possibly explaining how the data may be used. The OEM may then define and save that structure in a file on the web for later access by an interested party.

For example, in the case where the structure is defined in a file, the header fields may reflect the binary number 10000100001. This binary number may then be related in some manner, such as inclusion of the binary number in the file name, to the file, or as the primary key in a database table that may define the specific attributes of the contained information. For example, the file may contain codes to relate that a data field called Manufacturer Name may contain from 0 to 20 ASCII characters. A field called oModelNumber may contain from 0 to 10 ASCII characters.

The tag may then be populated with data by the purchaser, repair facility or any other interested party or user. A second tag user, such as the purchaser, may provide a field called uComponentOwnerName. and another called uServiceDate. Once written to the tag, the data may also be protected from alteration. Each page or row of data may be protected by locking that row. Each page may actually store 64 bits of data plus 16 bits of cyclic redundancy check (CRC) code. The CRC bits may be used to verify data integrity at any time in the future.

If included, a second header row may be defined similarly, however, it may be defined by the same party defining the first header row or by another party such as the purchaser or user of the valve. It may also use a unique number in another header row that relates the tag structure to the detail of the information contained on the tag. The "o" and the "u" in the preceding examples are provided for illustrative purposes only and may be any other letters or combination of characters as desired in the design of the code structure or fields. As defined previously. a character may be defined broadly to be comprised of a bit or a collection of bits.

Continuing with the example, when the tag is scanned the computer searches internally and/or on the tag for header format, including searching in a file that may correlate with software that supports the RFID interrogator. If the format is not found or only partially found, the format or remainder of the format may be downloaded from an appropriate location such as a file on disk or on a web site. The system is flexible. A first party, such as an OEM may put as much or as little information on the tag as they desire, within the capacity limits of the tag,. For example, as illustrated in Tables 5 and 6, the OEM may write the data in ASCII 8 bit data, or floating integer, ASCII 7 bit string, Boolean, time date stamp or many other data types.

Referring to the Tables to illustrate a system of generally preferred embodiments for structuring and handling data with an RFID tag system in the process industry, the system and embodiments may be employed as a universal system to establish a standard for such system in the process or related industries. In a preferred embodiment, the first page or row of data is the main header. The five least significant bits on the main header, or any other header, may define the format code. This may provide the option of having up to 32 tag format codes. Table 1 illustrates the location of bits that indicate the format code used in the respective tag. When the value of bit numbers one through five equals zero or one, then the computer knows the data format is as depicted in Table 2 and that the header format data may be accessed directly from the tag. If the value of bit number one through five equals zero, then the computer knows that there is only one header and that header is in the format as depicted in Table 2. If the value of bit number one through five equals one, then the computer knows that there are two headers, with the format of each header in the format as depicted in Table 2. When the value of bit numbers one through five equals two or three, then the computer knows the data format is in the format as generally depicted in Table 3 and that the format definition file is stored remote to the tag and may be accessed remote to the tag. If the value of bit number one through five equals two, then the computer knows by reading the header information located on the first page on the tag, in the format as depicted in Table 3, that there is only one header with the general format as depicted in Table 3 and having a specific format definition file as defined by the format definition file which is located remote to the tag. The value of bit number one through five equals three, then the computer knows that there are two headers, each with the general format as depicted in Table 3 and having a specific definition file which is located remote to the tag. Table 4 illustrates the layout of the format definition file.

In one preferred method, if the binary value of the five least significant bits is three and there are two headers, the general information pertaining to the first header may be on found on page or row one and may identify the remote format definition file and may define the format code for pages three through ten. The second header may be on page two and may identify the format code for pages 11 through 17. Both headers must use the same format types; e.g. bits 1–5 must be the same. This format type is intended for applications where two independent entities, Such as an OEM and an end user must share data space on one tag. The meaning of the bits is generally as described in Table 3 and particularly as defined in the header File.

A "format definition file," as identified in Table 4, may create a relationship between the data layout on the tag and a file that contains the details of the layout. The format definition file may be a binary file that defines the details of how data has been written on a tag. This file may be required for format types two and three described above. A format definition file may also be required for future or alternative format types. Table 4. Illustrates a preferred embodiment of a format definition file layout for use in the process and related industries.

Supported data types for format code values of zero or one in the first five least significant bits for use in the process and related industries are defined in Table 5. Supported data types for use with the process and related industries for format code values of two or three in the first five least significant bits are defined in Table 6.

The system illustrated in the tables permits that data may be written to each page in such a manner as to compress each piece of data against the previous, in order to avoid having a wasted space on each page. When the data is entered on that page and it is desired to close that page in order to protect the page, then the remaining space on the page may be wasted.

TABLE 1

Location of Bits that Indicate the Format Code

| Bit No. | Information | Combinations | Description |
|---------|-------------|--------------|-------------|
| 1–5 | Format Code | 32 | Note 1 |
| 6–64 | Meaning depends on the value of bits 1–5 | $2^{59}$ | |

1 Table 2 describes the bit definitions when the value of bits 1–5 is 0.
Table 2 describes the bit definitions when the value of bits 1–5 is 1.
Table 3 describes the bit definitions when the value of bits 1–5 is 2.
Table 3 describes the bit definitions when the value of bits 1–5 is 3.

TABLE 2

Bit Definition for Format Code Equal to 0 and for Format Code Equal to 1

| Bit No. | Information | Combinations | Description |
|---------|-------------|--------------|-------------|
| 1–5 | Format Code | 32 | See Table 1 |
| 6–9 | Data Type of Record 1 | 16 | Note 1 |
| 10–14 | Field Count of Record 1 | 32 | Note 2 |
| 15 | Break Indicator for Record 1 | 2 | Note 3 |
| 16–19 | Data Type of Record 2 | 16 | Note 1 |
| 20–24 | Field Count of Record 2 | 32 | Note 2 |
| 25 | Break Indicator for Record 2 | 2 | Note 3 |

TABLE 2-continued

Bit Definition for Format Code Equal to 0 and for Format Code Equal to 1

| Bit No. | Information | Combinations | Description |
|---------|-------------|--------------|-------------|
| 26–29 | Data Type of Record 3 | 16 | Note 1 |
| 30–34 | Field Count of Record 3 | 32 | Note 2 |
| 35 | Break Indicator for Record 3 | 2 | Note 3 |
| 36–39 | Data Type of Record 4 | 16 | Note 1 |
| 40–44 | Field Count of Record 4 | 32 | Note 2 |
| 45 | Break Indicator for Record 4 | 2 | Note 3 |
| 46–49 | Data Type of Record 5 | 16 | Note 1 |
| 50–54 | Field Count of Record 5 | 32 | Note 2 |
| 55 | Break Indicator for Record 5 | 2 | Note 3 |
| 56–59 | Data Type of Record 6 | 16 | Note 1 |
| 60–64 | Field Count of Record 6 | 32 | Note 2 |

1 This bit field is an enumeration of 16 possible data types supported by the tag. See table 5 for specifics.
2 This bit field gives the count of how many fields of the previous bit field's type.
3 If this bit is 0 the next record's data follows the end of the previous record's data. If the bit is 1 the next record's data begins at the start of the next page.

TABLE 3

Bit Definitions for Format Code Equal to 2 or Format Code Equal to 3

| Bit No. | Information | Combinations | Description |
|---------|-------------|--------------|-------------|
| 1–5 | Format Code | 32 | See Table 1 |
| 6–32 | Reserved | $2^{27}$ | |
| 33–64 | Format Definition Number | $2^{32}$ | Note 1 |

1 The format definition number creates a relationship between the data layout on the tag and a file that contains the details of the layout. The specifics of the information contained in the file can be found in the section "The Format of the Format Definition File."

TABLE 4

Format Definition File Layout

| Number of Bytes | Description |
|-----------------|-------------|
| 4 | Identification Number - should be the same as the name of the file (without the extension). If is an error if it is not. This number also corresponds to the value in bits 33–64 of the tag header. |
| 2 | The header number. If this value is 0, this format is one that refers to the first part of a tag, sometimes referred to as the OEM portion of the tag. If this value is 1, this format is one that refers to the second part of a tag sometimes referred to as the End User portion of the tag. |
| 2 | The number of fields defined (n) |
| ** Repeat the following for each field | |
| 2 | The length of the name of the field (len) |
| len | The name of the field |
| 2 | The length of the comment string for the field (len) |
| len | The comment associated with the field |
| 2 | The data type of the field |
| 2 | The number of items if the specified data type. In general this will be 1 for all data types except for the 7 and 8 bit ASCII string types. |
| 2 | An indicator of whether the next data field should be forced to begin on a new page. 1 = force new page. |

TABLE 4-continued

Format Definition File Layout

| Number of Bytes | Description |
|---|---|
| Go back to ** for each field (n-1 times). | |
| 2 | File CRC. This is a CRC calculated over the entire file. This is used to ensure data integrity. |

TABLE 5

Supported Data Types for Format Code 0 and 1

| Value of Bit Field | Size (bits) | Description | Range |
|---|---|---|---|
| 0 | 0 | None (no type defined) | None |
| 1 | 1 | Boolean | 0 and 1 |
| 2 | 8 | Unsigned byte | 0–255 |
| 3 | 16 | Unsigned word | 0–65535 |
| 4 | 32 | Unsigned long | 0–4294967295 |
| 5 | 8 | Signed byte | −127–128 |
| 6 | 16 | Signed word | −32768–32768 |
| 7 | 32 | Signed long | −2147483647–2147483648 |
| 8 | 7 | 7 bit ASCII char | |
| 9 | 8 | 8 bit ASCII char | |
| 10 | 32 | Single precision IEEE float | 6.5 significant digits |
| 11 | 64 | Double precision IEEE float | 13.5 significant digits |
| 12 | 11 | Hour and minute | |
| 13 | 17 | Date | 1900–2155 |
| 14 | 7 * number of characters | 7 bit character string | |
| 15 | 8 * number of characters | 8 bit character string | |

TABLE 6

Supported Data Types for Format Code 2 and 3

| Value of Bit Field | Size (bits) | Description | Range |
|---|---|---|---|
| 0 | 0 | None (no type defined) | None |
| 1 | 1 | Boolean | 0 and 1 |
| 2 | 8 | Unsigned byte | 0–255 |
| 3 | 16 | Unsigned word | 0–65535 |
| 4 | 32 | Unsigned long | 0–4294967295 |
| 5 | 8 | Signed byte | −127–128 |
| 6 | 16 | Signed word | −32768–32768 |
| 7 | 32 | Signed long | −2147483647–2147483648 |
| 8 | 32 | Single precision IEEE float | 6.5 significant digits |
| 9 | 64 | Double precision IEEE float | 13.5 significant digits |
| 10 | 11 | Hour and minute | |
| 11 | 17 | Date | 1900–2155 |
| 12 | 7 * number of characters | 7 bit character string | |
| 13 | 8 * number of characters | 8 bit character string | |

It may be appreciated that various changes to the details of the illustrated methods and method embodiments disclosed herein may be made without departing from the spirit of the invention. While preferred and alternative embodiments of the present invention have been described and illustrated in detail, it is apparent that still further modifications and adaptations of the preferred and alternative embodiments will occur to those skilled in the art. However, it is to be expressly understood that such modifications and adaptations are within the spirit and scope of the present invention, which is set forth in the following claims.

What is claimed:

1. A method of using an RFID tag associated with a component, the RFID tag including a tag transponder to conduct data representing information from the RFID tag to an RFID tag interrogator, the method including:
   providing a data storage member within the RFID tag transponder for storing data on the data storage member;
   selecting a data format from a plurality of data formats, the selected data format organizing at least a portion of the data stored on the data storage member;
   identifying the selected data format with a data format name;
   recording the selected data format and the data format name remote to the RFID tag;
   storing the data format name within the RFID tag;
   communicating the stored data format name to the RFID tag interrogator;
   using the communicated data format name, providing the recorded data format to the RFID tag interrogator to instruct the RFID tag interrogator how to interpret the data stored within the data storage member;
   using the RFID tag interrogator, periodically writing stored data to the RFID tag data storage member consistent with the selected data format;
   using the RFID tag interrogator, periodically reading stored data from the RFID tag data storage member consistent with the selected data format; and
   reformatting at least one of the data periodically written to and the data periodically read from the RFID tag data storage member, such that the reformatted data is readable by an application software program.

2. The method of using an RFID tag as defined in claim 1, further comprising:
   arranging a memory capacity of the data storage member into one or more header blocks;
   defining a header format providing at least one of a location and a size of each of the one or more header blocks;
   identifying the header format with a header format name;
   storing the header format name within at least one of the one or more header blocks;
   recording the identified header format and the header format name remote to the RFID tag;
   communicating the stored header format name to the RFID tag interrogator; and
   using the communicated header format name, providing the recorded header format to the RFID tag interrogator to instruct the RFID tag interrogator how to determine at least one of the location and size of each of the one or more header blocks.

3. The method of using an RFID tag as defined in claim 2, further comprising:
   providing a header page for each of the one or more header blocks; and
   storing at least one of the header format name and the data format name within at least one of the header pages.

4. The method of using an RFID tag as defined in claim 3, wherein each header page further comprises:
a data field providing storage space for storing a fixed number of characters, wherein the stored characters comprise the data format name.

5. The method of using an RFID tag as defined in claim 3, further comprising:
selecting a first data format for a first header block;
identifying the first data format with a first data format name;
recording the selected first data format and the first data format name remote to the RFID tag;
storing the first data format name within a header page for the first header block;
selecting a second data format for a second header block;
identifying the second data format with a second data format name;
recording the selected second data format and the second data format name remote to the RFID tag;
storing the second data format name within a header page for the second header block;
communicating at least one of the stored first data format name and the stored second data format name to the RFID tag interrogator; and
using the communicated at least one of the first data format name and second data format name, providing the corresponding at least one of the recorded first data format and the recorded second data format to the RFID tag interrogator to instruct the RFID tag interrogator how to interpret data stored within the data storage member.

6. The method of using an RFID tag as defined in claim 5, wherein the first data is formatted by at least one of a component manufacturer and a component vendor.

7. The method of using an RFID tag as defined in claim 5, wherein the second data is formatted by at least one of a component purchaser, a component user, and a component repairer.

8. The method of using an RFID tag as defined in claim 2, further comprising:
storing the data format name within a header page of the one of the one or more header blocks.

9. The method of using an RFID tag as defined in claim 1, further comprising:
providing a cyclic redundancy check within the data storage member to verify data integrity of at least a portion of the data stored on the data storage member.

10. The method of using an RFID tag, as defined in claim 1, wherein recording the selected data format remote to the RFID tag comprises:
recording the selected data format in an electronic file accessible through a computer network.

11. A method of using an RFID tag associated with a component, the RFID tag including a tag transponder to conduct data representing information from the RFID tag to an RFID tag interrogator, the method including:
providing a data storage member within the RFID tag transponder for storing data on the data storage member;
selecting a first data format by a first data formatter to format a first portion of the data storage member;
identifying the first data format with a first data format name;
recording the selected first data format and the first data format name remote to the RFID tag;
storing the first data format name within the data storage member;
selecting a second data format by a second data formatter to format a second portion of the data storage member;
identifying the second data format with a second data format name;
recording the selected second data format and the second data format name remote to the RFID tag;
storing the second data format name within the data storage member;
communicating the stored first data format name and the stored second data format name to the RFID tag interrogator;
using the communicated stored first data format name and the stored second data format name to provide the corresponding recorded first data format and recorded second data format to the RFID tag interrogator to instruct the RFID tag interrogator how to interpret data stored within the first portion of the data storage member and the second portion of the data storage member;
using the RFID tag interrogator, periodically writing data to the first portion of the RFID tag data storage member and the second portion of the RFID tag data storage member consistent with the corresponding first and second data format; and
using the RFID tag interrogator, periodically reading data from the first portion of the RFID tag data storage member and the second portion of the RFID tag data storage member consistent with the corresponding first and second data format.

12. The method of using an RFID tag as defined in claim 11, further comprising:
periodically reformatting at least one of the data periodically written to and the data periodically read from the first portion of the RFID tag data storage member and the second portion of the data storage member, such that the reformatted data is readable by an application software program.

13. A method of using an RFID tag associated with a component, the RFID tag including a tag transponder to conduct data representing information from the RFID tag to an RFID tag interrogator, the method including:
providing a data storage member within the RFID tag transponder for storing data on the data storage member;
selecting an allocation of memory regions on the data storage member, each memory region being a header block, the data storage member including at least one header block;
defining the selected allocation of at least one header blocks in a header format;
identifying the header format with a header format name;
storing the header format name within at least one of the at least one header blocks;
recording the selected header format and the header format name remote to the RFID tag;
selecting a data format for each of the at least one header blocks, each data format selected by a corresponding data formatter from a plurality of data formatters, each selected data format organizing data stored within a corresponding header block;
identifying each selected data format with a corresponding data format name;

recording each selected data format and corresponding data format name remote to the RFID tag;

storing each data format name within the corresponding header block;

communicating the stored header format name from the RFID tag to the RFID tag interrogator;

communicating the stored data format names from the RFID tag to the RFID tag interrogator;

using each of the communicated data format names, providing at least one of the recorded data formats to the RFID tag interrogator to instruct the RFID tag interrogator how to interpret the data stored within the corresponding header block;

using the RFID tag interrogator, periodically writing stored data to the corresponding header block;

using the RFID tag interrogator, periodically reading data from the corresponding header block; and reformatting at least one of the data periodically written to and the data periodically read from the RFID tag data storage member, such that the reformatted data is readable by an application software program.

14. The method of using an RFID tag as defined in claim 13, further comprising:

providing a header page for each of the at least one header blocks; and storing the header format name within the header page of at least one of the at least one header blocks.

15. The method of using an RFID tag as defined in claim 14, further comprising:

selecting a first data format for a first header block;

identifying the first data format with a first data format name;

recording the selected first data format and the first data format name remote to the RFID tag;

storing the first data format name within the header page for the first header block;

selecting a second data format for a second header block;

identifying the second data format with a second data format name;

recording the selected second data format and the second format name remote to the RFID tag;

storing the second data format name within the header page for the second header block;

communicating each of the stored first data format name and the stored second data format name from the RFID tag to the RFID tag interrogator; and using each of the communicated first data format name and the communicated second data format name, providing at least one of the corresponding first data format and the corresponding second data format to the RFID tag interrogator to instruct the RFID tag interrogator how to interpret data stored within the data storage member.

16. The method of using an RFID tag as defined in claim 15, wherein the first data format is selected by at least one of a component manufacturer and a component vendor.

17. The method of using an RFID tag as defined in claim 15, wherein the second data format is selected by at least one of a component purchaser, a component user, and a component inspector.

18. The method of using an RFID tag as defined in claim 13, further comprising, providing a cyclic redundancy check within the data storage member to verify data integrity of at least a portion of the data stored on the data storage member.

19. The method of using an RFID tag, as defined in claim 13, wherein recording each selected data format and corresponding data format name remote to the RFID tag comprises storing each selected data format in a corresponding electronic file accessible through a computer network.

20. The method of using an RFID tag, as defined in claim 13, wherein recording the selected header format and the header format name remote to the RFID tag comprises storing the selected header format in an electronic file accessible through a computer network.

\* \* \* \* \*